United States Patent [19]

White et al.

[11] 4,166,978
[45] Sep. 4, 1979

[54] TWO-WAY VOICE CONTROLLED COMMUNICATION SYSTEM

[75] Inventors: Maynard E. White, Elkhart, Ind.; Kenneth E. Monroe; Lindsey E. Waldorf, both of Ann Arbor, Mich.

[73] Assignee: Maynard E. White, Elkhart, Ind.

[21] Appl. No.: 909,685

[22] Filed: May 25, 1978

Related U.S. Application Data

[63] Continuation-in-part of Ser. No. 720,652, Sep. 7, 1976, abandoned.

[51] Int. Cl.$^2$ .............................................. H04B 1/38
[52] U.S. Cl. .................................. 325/22; 179/1 VC; 325/152
[58] Field of Search ........... 179/1 SW, 1 VC; 332/16, 332/29 R, 29 M; 325/16, 21, 22, 152, 361, 105, 187, 144

[56] References Cited

U.S. PATENT DOCUMENTS

| | | | |
|---|---|---|---|
| 3,283,074 | 11/1966 | Csicsatka | 325/22 |
| 3,360,880 | 1/1968 | Driver | 325/22 |
| 3,641,538 | 2/1972 | Whitney et al. | 325/105 |
| 3,968,435 | 6/1976 | Stover | 325/16 |

*Primary Examiner*—Benedict V. Safourek
*Attorney, Agent, or Firm*—Robert E. Wagner; Leo J. Aubel

[57] ABSTRACT

A two-way voice controlled communication system for use with a protective helmet. The communication system includes a transmitting circuit which is normally off, and which is voice actuated, and a receiving circuit which is normally on. The transmitting circuit includes a microphone and an electronic switch which turns the transmitting circuit on and the receiving circuit off in response to the presence of an output from the microphone, and turns the transmitting circuit off and the receiving circuit on substantially immediately in response to the absence of a microphone output. Thus the system approximates two-way real-time communication by permitting one user of the system to interrupt the speech of another user of the system. The system is designed primarily for far field communication, that is, omnidirectional communication where the spatial positioning of one communication system relative to a second communication system is essentially independent of the distance between the two systems.

14 Claims, 5 Drawing Figures

TWO-WAY VOICE CONTROLLED COMMUNICATION SYSTEM

CROSS REFERENCE TO RELATED APPLICATIONS

This is a continuation-in-part of co-pending application Ser. No. 720,652, filed Sept. 7, 1976, entitled TWO-WAY VOICE CONTROLLED COMMUNICATION SYSTEM, and now abandoned.

BACKGROUND OF THE INVENTION

This invention relates generally to a two-way communication system of the type which may be utilized with a protective helmet such as the helmet worn by the military, construction workers, factory workers, fire fighters and motorcyclists. More particularly, the present invention relates to an improved two-way communication system which approximates two-way real time communication.

Two-way communication systems are, of course, well known as exemplified by the U.S. Pat. No. 3,366,880 to Driver, U.S. Pat. No. 3,968,435 to Stover and U.S. Pat. No. 3,283,074 to Csicsatka. Of these three prior patents, the Stover patent, of course, relates to a two-way communication system for use with a helmet.

There are various problems with the two-way communication systems of the prior art. One of the problems has been the need to manually switch the system between a transmit mode and a receive mode. This has been overcome, in part, by voice controlled systems such as that disclosed in the Csicsatka patent referred to above.

However, prior to the present invention, even voice-controlled communication systems suffer from severe limitations.

For example, when such systems are being utilized, the person initially receiving a communication must wait an inordinate amount of time before responding to the person initially speaking. This is because the systems heretofore developed include a substantial delay in switching from the transmit mode to the receive mode. As a consequence of the delay, the person initially listening to the conversion must wait, before commencing a response, otherwise the initial portion of the return communication is not received. This results in a very stilted pattern of communications between users of these systems.

As a practical example of this delay, a person initially listening cannot interrupt, even at the end of a sentence, to warn the person speaking of an imminent danger.

We have discovered that it is possible to approach two-way real time communication, simulating actual speech patterns, by providing a system which substantially immediately switches into the receive mode when the user of the system is not speaking. This switching occurs during time intervals between words, during pauses in speech and at the end of sentences and the like to thus permit immediate responses over the communication system.

Another shortcoming of the prior systems is that exemplified by the aforementioned Stover Patent which is designed for use in the near field. Systems which are designed to operate in the near field are dependent on the spatial relationship between users of the system, as hereinafter explained, and thus provide a significant limitation on the distance over which these systems may be utilized.

We have determined that such a limitation is not feasible for a two-way communication system and hence our system is predominantly designed for use in the far field region.

Thus the present invention overcomes the heretofore described limitations of the prior art by providing a two-way voice controlled communication system which approximates two-way real time communications and which is designed primarily for use in the far field independent of the spatial relationship between users of the system.

SUMMARY OF THE INVENTION

The present invention is directed to an improved two-way communication system which is voice actuated and which is normally in a receive mode. In response to the voice of the user, the systems switches to the transmit mode and, in the absence of the voice of the user, including during short intervals between words and at the end of sentences, the system substantially immediately switches back into a receive mode thus permitting the user of the system to hear any interruptions or responses and thus approximating real time two-way communications.

The present invention is furthermore designed primarily for far field operation to thus avoid restrictions on the spatial orientation between users of the present system.

By way of further explanation, the near field is described as that region of the electromagnetic field immediately surrounding the antenna where reactive field predominates. This distance is less than $\lambda/2\pi$ where $\lambda$ is defined as the wave length at the transmitting frequency. In this region, radiation fields predominate and the angular field distribution is dependent upon the distance from the antenna of one such system to the antenna of another such system. This is often referred to as the Fresnel region. Within this region, the angular or spatial orientation between two users of such a system is critical and frequently the signal transmitted by one user cannot be heard by other users of the system purely because of their spatial orientation or location even though they may be a few feet away from the first user of the system.

The far field is that region farther away from the antenna where the angular field distribution is essentially independent of the distance from the antenna. This is referred to as the Fraunhofer region. In the Fraunhofer region, two users of the system can hear each other regardless of their spatial orientation.

This becomes of particular importance to fire fighters in a building where one fire fighter may be several floors above another fire fighter. While the distance between them may be only thirty feet, because the two fire fighters are vertically spaced apart, if a communication system is operating in the near field region the fire fighters could not receive the transmitted signals. whereas there would be no problem in receiving such signals if the systems are operated in the far field region.

Thus the present system is designed to primarily operate in the far field or Fraunhofer region contrary to prior art systems such as that disclosed in the aforementioned Stover U.S. Pat. No. 3,968,435.

Furthermore, the two-way voice controlled communication system of the present invention is of light weight and may be easily contained within a protective helmet.

It is the primary object of this invention to provide a two-way communication system which overcomes the foregoing limitations and disadvantages and is compact in size and light in weight and readily adapted for mounting upon a protective helmet.

A further object is to provide a two-way communication system which is normally in a signal receiving condition but which is automatically conditioned for signal transmission by the voice of the user.

A further object is to provide a communication system of this character which includes an automatic voice activated transmitter not responsive to ambient sound.

A further object is to provide a voice controlled two-way communication system utilizing a tunnel diode as a phase modulator.

A further object is to provide a two-way communication system mounted upon a protective helmet where, in one embodiment, a transducer causes the helmet to vibrate and become an acoustical reproducer or speaker.

BRIEF DESCRIPTION OF THE DRAWINGS

The various objects and advantages of the present invention will become apparent upon reading the following detailed description of the invention taken in conjunction with the drawings.

In the drawings, wherein like reference numerals identify corresponding components.

DESCRIPTION OF THE PREFERRED EMBODIMENT

Figure 1:
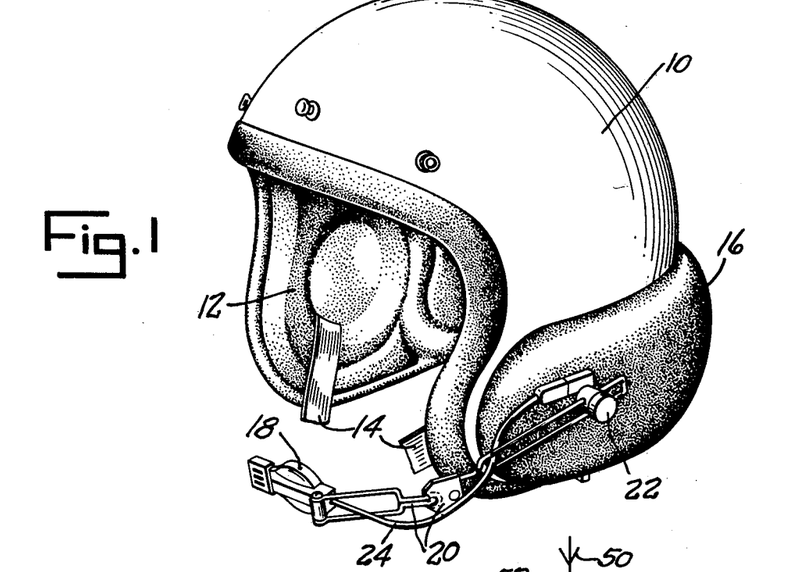
FIG. 1 is a perspective view of a helmet including the new two-way communication system.

Referring to the drawings which illustrate the preferred embodiment of the invention, the numeral 10 designates a protective helmet which may be of any desired type such as those worn by firemen, construction or factory workers, military personnel, sand blasters, police, motorcyclists, snowmobilers and sky divers and characterized by a rigid body having protective resilient or cushioning lining 12 and in some cases a chin strap or like securing means 14. Upon this helmet is mounted a carrier 16 for the electrical components of the signaling system, which carrier is preferably formed of resilient sponge rubber or synthetic rubber. A microphone 18 is mounted upon adjustable hinged supporting means 20 carried by an anchor member 22 supported by the helmet and projecting from the protective carrier 16. Except for the microphone and the electrical connections 24 leading thereto, all electrical and electronic components of the communication system, including the antenna, may be mounted within and protected by the carrier 16.

The helmet and carrier construction, and some variations thereof, are described more particularly in the aforementioned co-pending application Ser. No. 893,672, filed Apr. 5, 1978.

Figure 2:
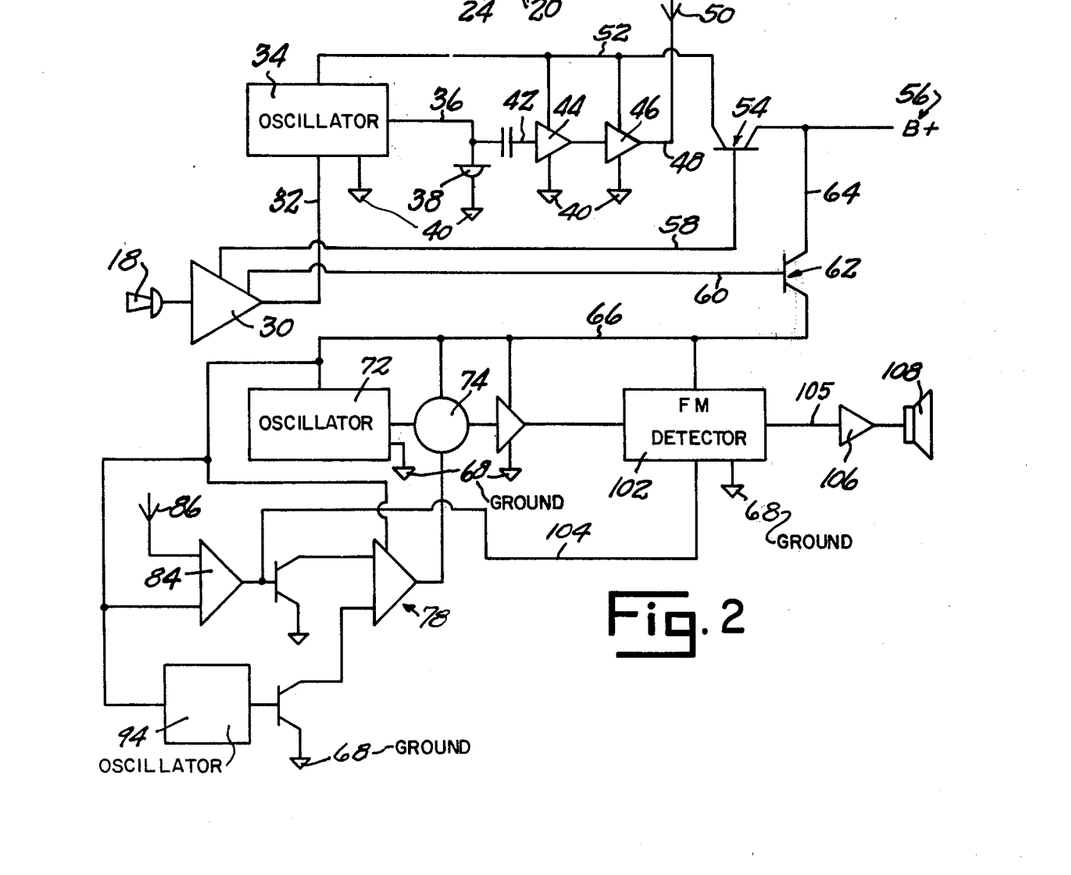
FIG. 2 is a block diagram of one embodiment of the invention.
Figure 4:
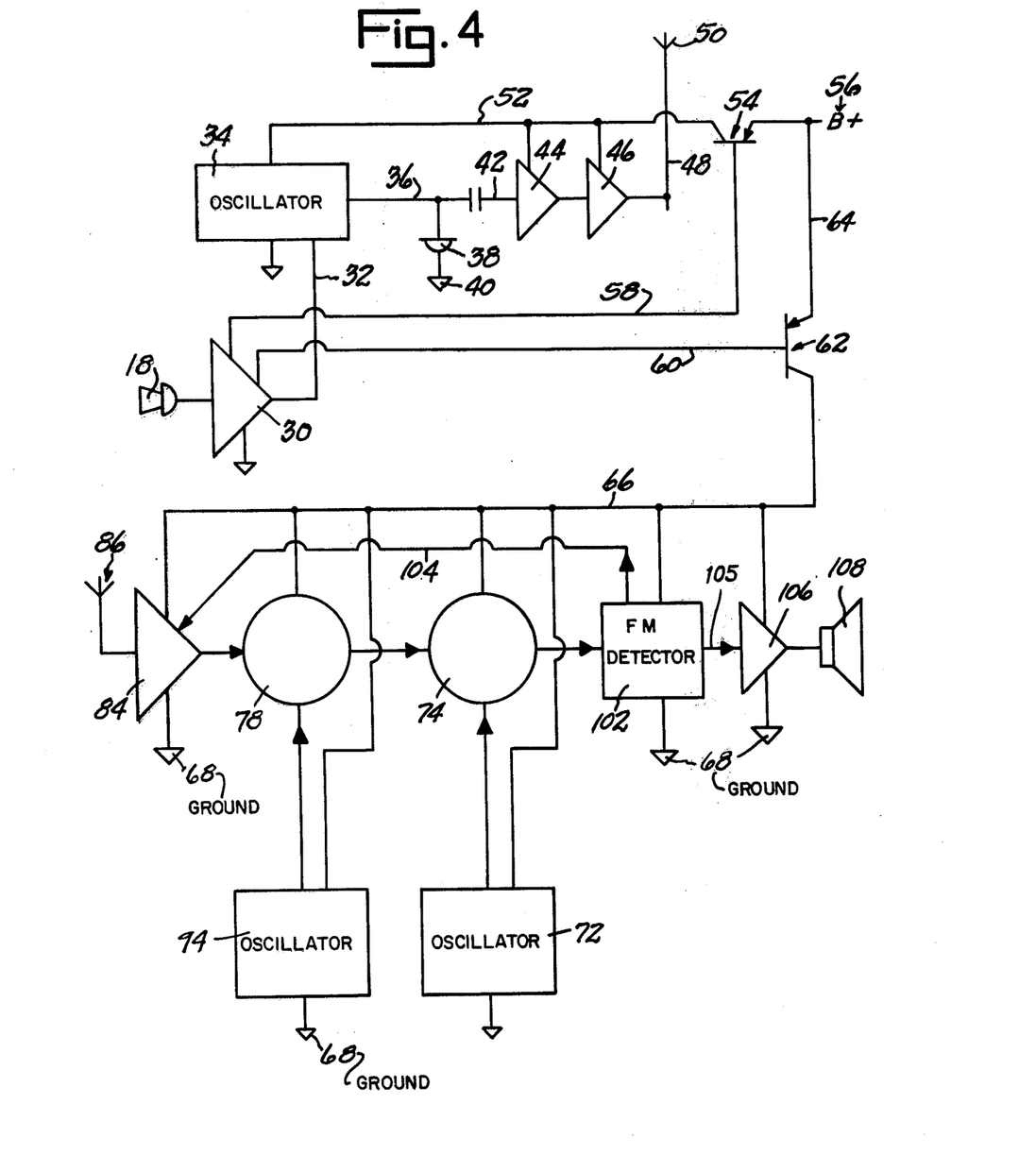
FIG. 4 is an alternate block diagram of the circuit.

FIGS. 2 and 4 are block diagrams of the communication system. In each of FIGS. 2 and 4, there is illustrated the two-way communication system including the signal transmitting circuitry and the signal receiving circuitry. System which both transmit and receive signals are commonly referred to as transceivers. The signal transmitting portion of the circuitry, in block form, will be explained first.

Microphone 18 is preferably of the noise cancelling type, i.e., the microphone has both sides of its diaphragm exposed so that planar waves such as ambient noise are cancelled out by their impacting against both sides of the microphone. Spherical waves, such as those occasioned by the microphone diaphragm being close to the mouth of the person speaking, cause the diaphragm to vibrate and thus transmit signals along lead 24. Noise cancelling microphones are, of course, conventional.

The microphone 18 is connected to a voice responsive amplifier 30 having three outputs. One output of the amplifier is connected by a lead 32 to a local oscillator 34. A first output from the local oscillator is connected by lead 36 to a tunnel diode 38 with the opposite side of the tunnel diode connected to system ground at 40. The output of the local oscillator 34 is also coupled across a capacitor and then via lead 42 to a first amplifier 44 and then a second amplifier 46 connected in series with the output of the first amplifier. Each of the components 30, 34, 38, 44 and 46 is connected to a common ground 40. The output from the second amplifier 46 is connected via lead 48 to a transmitting antenna 50.

A second input to the local oscillator 34 is connected by lead 52 from the collector of a transistor 54 which transistor has its emitter coupled to a positive source of potential such as a battery 56.

The second of the three outputs from the amplifier 30 is connected along lead 58 to the base of the transistor 54. A signal on lead 58 to the base of transistor 54 enables transistor 54 to be conducting and thus power flows from the battery 56 through transistor 54 to each of the amplifiers and to the oscillator.

The signal receiving portion of the circuit of the present invention will now be explained. The incoming communication signal is received by an antenna 86 and the incoming signals from the antenna 86 are fed to a preamplifier 84 which also receives an input from the battery 56 through transistor 62 and along lead 66. As is well known, although two antennas 50 and 86 are described, a single antenna may be utilized for both transmitting and receiving signals.

The third output from the amplifier 30 of the transmitter circuit is coupled along lead 60 to the base of transistor 62. Transistor 62 has a positive source of potential connected to its emitter along lead 64. A signal on lead 60 to the base of transistor 62 enables transistor 62 to be conducting and thus power flows from the battery 56 along lead 64, through transistor 62 to the signal receiving circuit along lead 66.

The battery or source of potential 56 thus provides power to a first oscillator 94, the output of which may be fed through a transistor (shown in FIG. 2) and is fed to a first mixer 78. The output of the preamplifier 84 may be fed through a transistor (FIG. 2) is also connected to the first mixer 78. The output of the first mixer 78 is connected to a second mixer 74.

As is conventional with receivers of this type, a second local oscillator 72 is provided and this oscillator also receives power from the battery 56 through transistor 62 and lead 66. The output of this local oscillator 72 is also fed to the second mixer 74.

The output of the second mixer 74 is fed to an FM detector 102 which is also powered by the battery 56 through transistor 62. For the purposes of providing automatic gain control, another input to the preamplifier 84 is connected along lead 104 from the FM detector 102. The output of the FM detector 102 is coupled along lead 105 to an audio amplifier 106 and the output of audio amplifier 106 is connected to a transducer or sound reproducing unit 108. Each of the components 84, 72, 102 and 106 is connected with a common system ground designated 68.

As is conventional, system ground 68 and system ground 40 are one and the same and are at a negative potential relative to the battery 56. Also as is well understood by circuit designers, the relative polarity of the battery and the system ground may be reversed with suitable changing of the biasing of the components and changing from NPN to PNP transistors.

Figure 3:
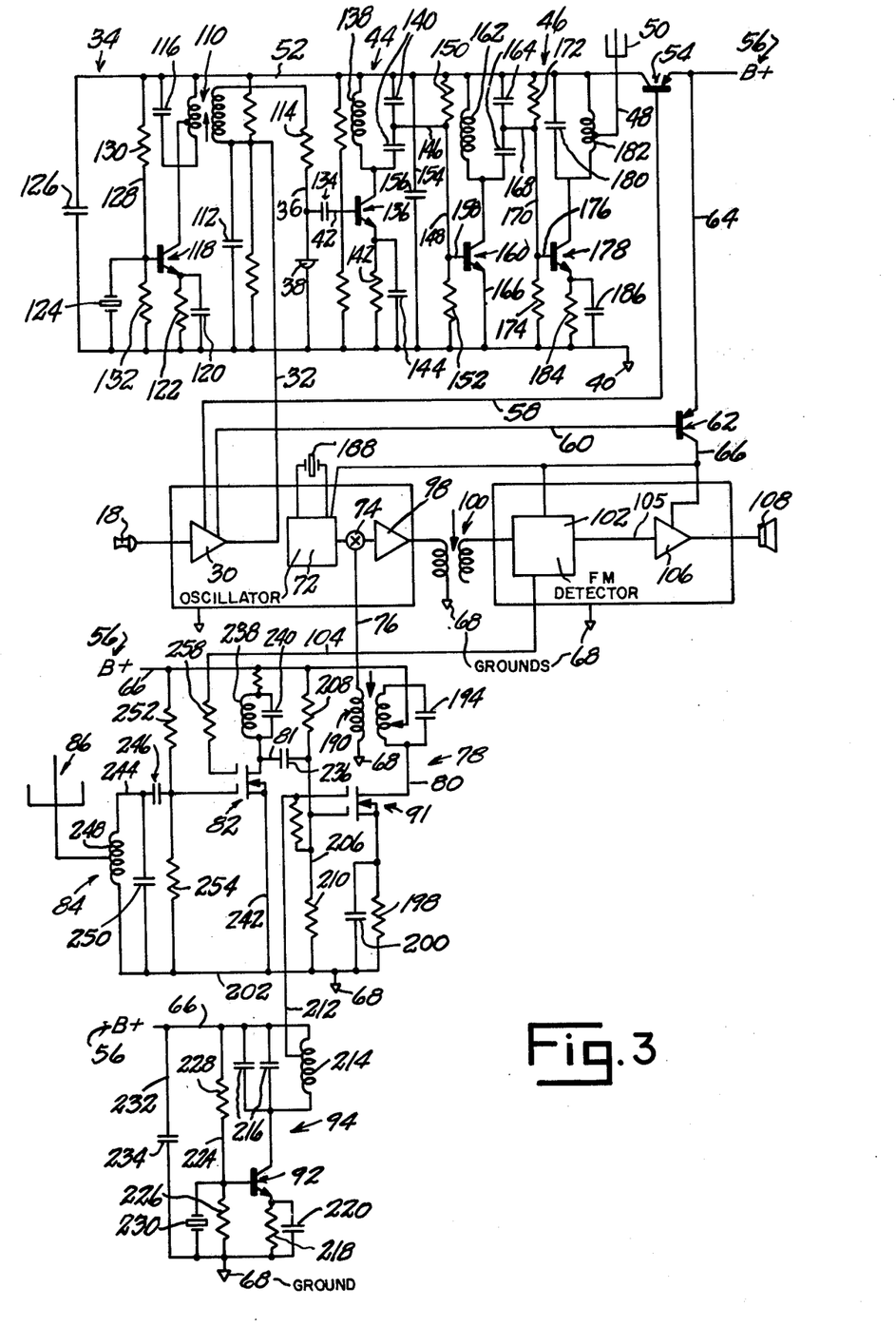
FIG. 3 is a circuit diagram illustrating one embodiment of the invention.

Having thus described the transmitting and receiving circuits in block diagram form, reference should now be had to FIG. 3 for a detailed explanation of the circuit of the present system.

Referring to FIG. 3, the local oscillator 34 includes a coupling transformer 110 which receives the signal along lead 32 from the first output of the voice responsive amplifier 30. One side of the secondary of transformer 110 is connected by capacitor 112 to ground. The other side of the secondary is connected through a resistor 114 to the tunnel diode 38. One side of the primary coil of the coupling transformer 110 is connected through capacitor 116 to lead 52 while the other side is directly connected to lead 52. The primary of the coil is tapped to provide a signal to the collector of transistor 118. The emitter of transistor 118 is connected through the parallel combination of a capacitor 120 and a resistor 122 to ground. The base of transistor 118 is connected through a crystal element 124 to ground. A capacitor 126 is connected between lead 52 and ground, on the primary side of the coil and a voltage divider, comprising resistors 130 and 132 is also connected between lead 52 and ground. The junction of these resistors, is also connected via lead 128 to the base of transistor 118.

This completes the description of the oscillator circuit 34. As may be appreciated, many changes in the details of the oscillator may be made by circuit designers.

The output of the oscillator circuit 34 is coupled to one side of the tunnel diode 38 via lead 36 as previously described. The output from the local oscillator is also coupled along lead 36 across a capacitor 134 and then through a lead 42 to the first amplifier 44 which constitutes a multiplier circuit.

In this multiplier circuit lead 42 is connected to the base of a transistor 136 which transistor has its collector connected to lead 52 through a tank circuit in parallel branches; one branch includes an inductance 138 and the other branch includes a pair of capacitors 140. Transistor 136 has its emitter connected to ground through by parallel branches including a resistor 142 in one branch and a capacitor 144 in the other branch. In the amplifier circuit 44, the two capacitors 140 provide capacitive coupling as follows. A lead 146 is connected to the junction between the capacitors and resistors 150 and 152 provide a voltage divider or biasing between leads 52 and ground. The lead 146 is coupled to the junction of these two resistors 150 and 152 and a lead 148 is identified as this junction. The lead 52 and ground are also capacitively connected along lead 154 and a capacitor 156. A lead 158 from the junction of the resistors 150 and 152 is connected to the base of a transistor 160. The collector of transistor 160 is coupled through a parallel circuit to the lead 52. Specifically, this parallel circuit includes, in one branch, an inductance 162 and, in the other branch, a pair of capacitors 164 to also provide capacitive coupling. The emitter of the transistor 160 is coupled through lead 166 to ground.

Again to provide capacitive coupling, the junction of capacitors 164 is defined as lead 168. This lead is also connected to the junction of a biasing or voltage divider network comprising a pair of resistors 172 and 174 having lead 170 defined as the junction between the two resistors. The two resistors are connected between ground and lead 52 and define the input to the second amplifier 46.

A lead 176, connected to the junction 170 of resistors 172 and 174, is connected to the base of a transistor 178. The collector of transistor 178 is connected a lead 52 through a tank circuit in which capacitor 180 and inductance 182 are located in parallel branches. The transmitting antenna 50 is connected to a tap on the inductance 182 by the lead 48. The emitter of transistor 178 is connected to ground by a parallel combination of a resistor 184 and a capacitor 186. The common ground for components of the transmitting circuit is shown at 40. This concludes the detailed circuit description of the transmitting portion of the circuit. As may be seen, each of the transistors has its collector coupled through transistor 54 to the source of potential 56. Thus, as may be appreciated, when transistor 54 is non-conducting there will be no output signal from the transmitting antenna because none of the transistors 118, 136, 160 or 178 will be enabled.

The receiving portion of the circuit will now be explained.

The incoming signal from the antenna 86 is fed to the preamplifier 84 and specifically to the tap of an inductance 248. The preamplifier circuit 84 includes the parallel combination of the inductance 248 and a capacitor 250. One junction between these elements is identified as lead 202 which is the system ground and the other junction between these elements is identified as lead 244. Lead 244 is coupled through a capacitor 246 to one gate of a dual gate metal oxide semi-conductor 82.

Power from the battery 56 is coupled via lead 66 and through switching transistor 62 and across a voltage divider of resistors 252 and 254 to lead 202 (ground). The junction of these two resistors is also connected to the same gate of semi-conductor 82. To provide the automatic gain control as previously described, one output from the FM detector 102 is coupled along lead 104 back to the preamplifier circuit 84 and more specifically across a resistor 258 to the other gate of the semi-conductor 82. The semi-conductor 82 is connected to the source of power from lead 66 through the parallel combination of an inductance 238 and a capacitance 240. Semi-conductor 82 is connected by lead 242 to the lead 202 which is the common ground 68.

The preamplifier circuit 84 is connected to a first mixer 78 by lead 81 and a capacitor 236 from the output of semi-conductor 82. The first mixer circuit includes resistors 208 and 210 connected at their junction 206 to capacitor 236, with resistors 208 and 210 being connected between lead 66 (power) and lead 202 (ground), respectively. The junction 206 between the resistors 208 and 210 is also connected to one gate of a second dual gate metal oxide semi-conductor 91. The other gate of this semi-conductor receives a signal from the oscillator 94 along lead 212. The semi-conductor 91 is connected to ground through the parallel combination of a resistor 198 and a capacitor 200. Semi-conductor 91 is also connected to the power source by lead 80 and then through the parallel circuit including the primary coil of transformer 190, in one branch, and a capacitor 194 in the other branch. Power is supplied to a tap on the primary coil. The secondary coil of the transformer 190 is connected by lead 76 to the second mixer 74 thus providing the output to the second mixer.

First local oscillator circuit 94 is connected to the battery by lead 66 and transistor 62, and through lead 232 and a capacitor 234 to ground 68. The oscillator includes a transistor 92 having its base connected to the junction 224 of resistors 226 and 228 which resistors have their opposite sides connected to ground and the power supply, respectively. The emitter of transistor 92 is also connected to the common ground through the parallel combination of a resistor 218 and a capacitor 220. Also coupled to the base of transistor 92 is a crystal 230 which is coupled in parallel across resistor 226 to ground. The collector of transistor 92 is connected by three parallel branches to the power supply. A coil 214 is in the first of these branches while capacitors 216 are in each of the second and third branches. The output of the local oscillator is tapped from coil 214 and connected by lead 212 to the second gate of the semi-conductor 91 of the first mixer 78.

A second local oscillator 72, also connected to the battery via lead 66, is controlled by a crystal 188 and is coupled to a second mixer 74. Second mixer 74 is connected by lead 76 to the output of the first mixer 78. The output of the second mixer 74 is fed through amplifier 98 and tuning coil 100 to the FM detector 102 which also provides automatic gain control via line 104 back to the preamplifier 84.

The output of the FM detector 102 is connected on lead 105 to an audio amplifier 106 whose output is delivered to the transduce or speaker element 108 of the receiving set.

The semi-conductors 82 and 91 are preferably of the dual gate MOS field effect transistor type. The microphone 18 is of the noise cancelling type which is not activated by ambient sound and is responsive only to the voice of the wearer of the helmet. For this purpose the microphone is mounted by the adjustable support 20 for adjustment to a position close to the mouth of the wearer of the helmet 10.

In an optional embodiment, the speaker, transducer or receiver 108 may include a vibratory element responsive to a received signal and contacting the material of the helmet 10 in such relation that the material of the helmet is vibrated and is comparable to the diaphragm of a conventional speaker. Thus any received signals are readily heard and distinguished by the wearer of the helmet otherwise a conventional speaker may be used.

The antennas 50 and 86 are elements which may be housed within the carrier 16 in any suitable or convenient fashion. The electrical and electronic components of the circuit are encapsulated so as to be compact and to fit within cavities in the carrier 16. The carrier is also provided with cavities within which the operating batteries may be mounted.

The tunnel diode 38 is employed, as by control of the bias (audio signal), to change switching times at radio frequency rates to produce phase modulation.

The two-way communication system of the present invention is normally in the receive mode and is switched into the transmit mode in response to the voice of the user. As previously described and as hereinafter explained in greater detail, the system will promptly switch back into a receive mode during pauses in the speech of the user to thus permit a listener to break in on a conversation and thus provide real time two-way communication.

Having thus described the circuit details, the operation will now be explained. The amplifier 30 has a gain control input, as will be described, and has a voltage comparator on its output. The voltage comparator changes the state of an internal flip-flop or multivibrator circuit, as hereinafter described, which switches and controls the transmitter and receiver.

Because the microphone 18 is of the noise cancelling type which is not responsive to ambient sound, the amplifier 30 and associated circuit elements are normally off or not active, and the transistor 62 is conducting to provide power to the receiver including the amplifier 84, the local oscillators 72 and 94, the mixers 74 and 78, the detector 102, the amplifier 106 and the transducer or speaker element 108. While transistor 62 is conducting the transistor 54 is not active or functioning and the transmitting section of the circuit is disabled or not in operation. The signals received at the receiving antenna 86 feed the transistor (semiconductor) 82 whose gain is controlled by the FM detector 102. The FM detector 102 contains a capacitor and rectifier which provide a direct current signal proportional to the audio level fed thereto at the tuning coil 100. The output of the transistor (semiconductor) 82 feeds the transistor (semiconductor) 91 whose function is to be a first detector. The other signal to the transistor (semiconductor) 91 is derived from a constant frequency oscillator which is controlled by the crystal 230.

The output of the transistor (semiconductor) 91 is the difference between that derived from the crystal controlled oscillator 94 and the incoming radio frequency. The output of transistor (semiconductor) 91 is multiplied by a second local oscillator 72 controlled by crystal 188 and produces a difference frequency at 450 kilohertz which is amplified at the intermediate frequency amplifier 98.

In the preferred form, various elements including the amplifier 30, the local oscillator 72, the crystal 188, the mixer 74, and the intermediate frequency amplifier 98, are contained in a chip identified as IC MOA 902. The output of the intermediate frequency amplifier 98 passes through the tuning coil 100 to the FM detector 102. The FM detector 102 is contained in a second chip which also contains the amplifier 106 fed by that FM detector and passes the signal to the speaker or transducer 108 which vibrates the helmet. The transducer of the speaker 108 may be either conventional or, if vibrating, of the piezoelectric or the electromechanical type.

Upon energization of the microphone 18, the amplifier 30 is activated to energize the transmitter circuit by turning on the transistor 54, and simultaneously deactivating the transistor 62 to shut off the receiver. A chip containing the amplifier 30 also includes a flip-flop operating an off-on signal to turn on either transistor 54 or 62.

The amplified audio signal derived from the microphone 18 is fed through line 32 to the local oscillator 34 and the tunnel diode 38 to change the bias or switch point. The output of the tunnel diode 38 passes through capacitor 134 to amplifier 44 loaded with a tank circuit and containing transistor 136 and its associated components. This tank circuit is a multiple of the local oscillation frequency constituting a multiplier circuit by capacitive coupling. The second amplifier 46, which includes the transistor 178 and associated components, further boosts the power and cooperates with the amplifier 44 to remove unwanted harmonics of the signal delivered to the transmitting antenna 50.

Figure 5:
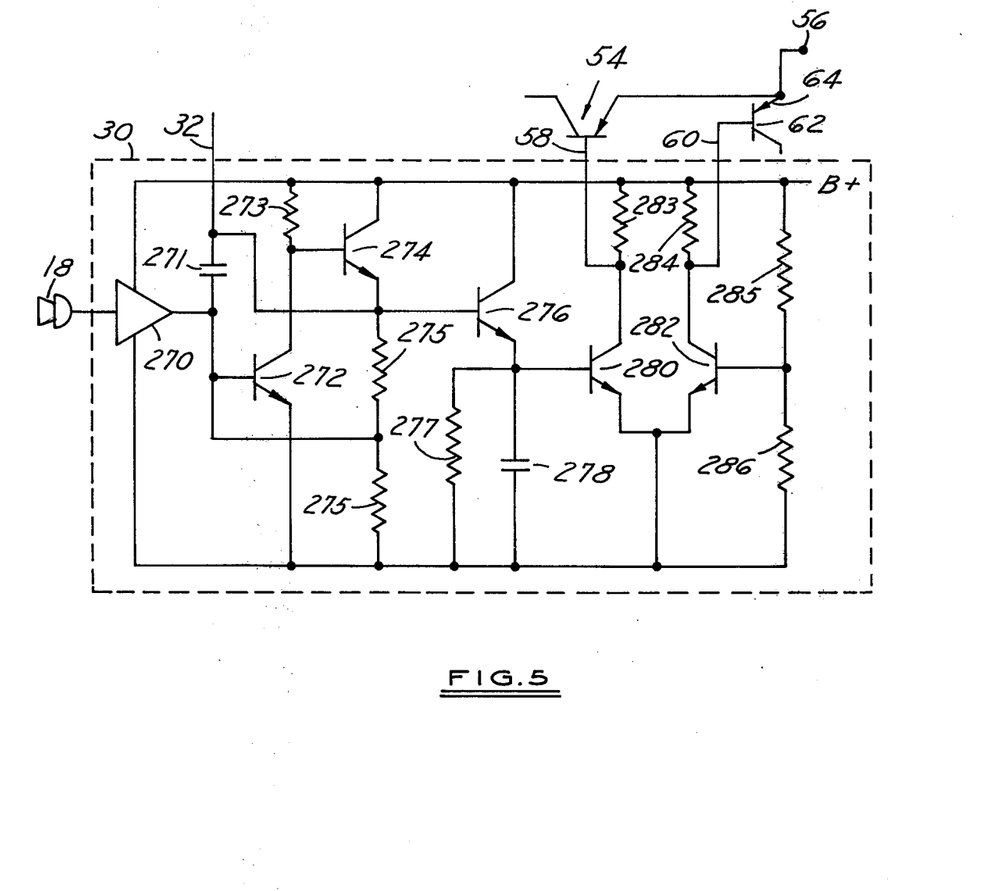
FIG. 5 is a diagram of part of the circuit of the present invention.

To further illustrate the electronic switching heretofore described with respect to changing into the transmit mode, in response to a signal caused by the voice of the user of the system, and to further explain the substantially immediate switching back into receive mode during pauses in speech to permit real time two-way communication, reference should now be had to FIG. 5. FIG. 5 illustrates, in greater detail, the amplifier circuit 30 with its internal gain control input, voltage comparator and internal flip-flop as previously mentioned. In understanding FIG. 5, it should be remembered that the objective of this switching circuit is that transistor 62 should be always enabled, or on, by virtue of a signal on lead 60 except when the user of the system speaks and similarly, transistor 54 should be disabled, or off, by virtue of a low signal or the absence of a signal on lead 58 except when the user of the system speaks.

The incoming signal from the noise cancelling microphone 18 is fed to an automatic gain control amplifier 270. This automatic gain control amplifier is established to provide virtually constant audio output regardless of the intensity of the speaking voice, within the normal ranges of the gain control. This, of course, is conventional. One output from the automatic gain control amplifier 270 is coupled across a capacitor 271 to the audio output 32 and then to the oscillator 34 and tunnel diode 38 as previously described. The output from the automatic gain control amplifier 270 is also coupled to a second amplification stage within the amplifier 30.

Specifically, the output from the automatic gain control amplifier 270 is coupled to the base of a first transistor 272 which has its emitter coupled to system ground and its collector coupled through a resistor 273 to a source of positive potential. The collector output of the first transistor 272 serves as the base input to a second transistor 274 which has its collector coupled to the source of positive potential and its emitter coupled through series resistors 275 and 276, respectively, to the system ground. The junction between resistors 275 and 276 is coupled back to the base of transistor 272.

The output from the gain control amplifier 270 is also coupled across capacitor 271 to the base of a third transistor 276. The emitter of transistor 274 is also coupled to the base of transistor 276. The collector of transistor 276 is connected to the source of positive potential and the emitter of transistor 276 is coupled across the parallel circuit of resistor 277 and capacitor 278 to ground.

The output from the transistor 276 is taken from its emitter to the base of the internal flip-flop which controls the transmitter and receiver. The internal flip-flop includes a first transistor 280 and a second transistor 282 having their emitters interconnected and coupled to ground. The collector of transistor 280 receives a voltage from the power supply through a resistor 283 and has its collector coupled as lead 58 to the base of transistor 54. Similarly, transistor 282 has its collector coupled through a resistor 284 to the power supply and also has its collector coupled, as lead 60, to the base of transistor 62. The internal flip-flop circuit also includes a voltage divider coupled between the power supply and ground including resistors 285 and 286 having the junction therebetween coupled to the base of transistor 282.

The operation of the circuit will now be explained. As previously mentioned, the automatic gain control amplifier 270 operates in a conventional fashion to provide a substantially constant audio output on lead 32. Transistors 272 and 274 function as conventional amplifiers, to provide amplification of the signal and transistor 276, when conducting, charges capacitor 278 and functions as a clipping amplifier to control the turning on and turning off of transistors 280 and 282. A biasing voltage is provided through resistor 285 and the power supply to the base of transistor 282 such that transistor 282 is normally on, thus enabling the receive mode by presenting a high signal from its collector to lead 60, and transistor 280 is normally off thus providing a low signal from its collector along lead 58 and inhibiting transistor 54.

When the user of the system wishes to speak, the voice is picked up by the microphone 18 and the automatic gain control amplifier provides a signal which is amplified by the transistor 272 and 274 to the base of transistor 276. Transistor 276 conducts and as soon as capacitor 278 charges to a point where the voltage at the base transistor 280 exceeds the bias voltage at the base of transistor 282, the two transistors 280 and 282 flip-flop or change their respective states so that transistor 280 conducts and transistor 282 is nonconducting. Transistor 280 conducting provides a signal on line 58 to enable transistor 54 and thus enable the transmitting portion of the circuit. Simultaneously, transistor 282 is disabled thus removing the enabling signal on lead 60 to transistor 62 to the receive portion of the circuit and thus inhibiting the receive portion of the circuit.

As soon as the user of the system stops speaking, even during a brief pause, the signal is removed from the base of the transistor 276 and the signal at the base of transistor 280 is discharged through the RC circuit comprising the resistor 277 and the capacitor 278. As soon as the signal at the base of transistor 280 drops below the biasing voltage at the base of the transistor 282, the two transistors flip-flop again with transistor 280 becoming non-conducting, thus disabling the transistor 54, while transistor 282 becomes conducting, thus enabling the transistor 62. This permits a break or an interruption in the communication by permitting the person initially listening to interrupt during pauses in speech. We have determined for effective real-time two-way communication the time constant of the RC circuit should be such that the signal at the base of transistor 280 drops to a value below the bias at the base of transistor 282 within the range of three to ten milliseconds. This provides a sufficiently fast switching to permit interruptions in speech during normal pauses in speech to provide effective real-time two-way communication approaching that which is provided by dual channel systems such as telephony.

Thus the two transistors 280 and 282 function as a flip-flop and the transistors also function as a voltage comparator since transistor 280 is conducting only when its base voltage exceeds the constant base voltage of transistor 282. Furthermore these transistors 280 and 282, in conjunction with resistor 277 and capacitor 278 function as an astable multivibrator by returning to the preferred state (transistor 282 on) a desired time interval after removal of the signal from transistor 276. The time interval, of course, is based on the time constant of the RC circuit.

This two-way communication system is crystal controlled, constituting a transceiver or transmitter and a receiver in a single package, and permits operation of the unit within an assigned frequency range.

With respect to far field operation, the output or transmitting frequency is selected in the range of 50 megahertz and thus the wavelength is about 18 feet. Since the near field is defined as less than $\lambda/2\pi$, it appears that at a distance between systems in excess of three feet, the systems will be operating in the far field region.

While the preferred embodiment of the invention has been illustrated and described, it will be understood that changes in the construction may be made within the scope of the appended claims without departing from the spirit of the invention.

What is claimed is:

1. In a two-way voice controlled communication system including a transmitting circuit having a noise cancelling microphone, signal amplifying means connected to said microphone and transmitting antenna means; a receiving circuit including receiving antenna means, signal amplifying means and signal transducing means connected thereto, said receiving circuit being normally enabled and said transmitting circuit being normally disabled, the improvement comprising:

said signal transmitting circuit including switching means coupled to both said transmitting circuit and said receiving circuit, said switching means responsive to the presence of an output signal from said microphone for enabling said transmitting circuit and disabling said receiving circuit;

said switching means further responsive to the absence of said output signal from said microphone for substantially immediately disabling said transmitting circuit and enabling said receiving circuit so that the system will receive signals even during short duration absences of transmissions thus providing two-way real-time voice controlled communication.

2. The invention as defined in claim 1, wherein said switching means includes a voltage comparator means for enabling and disabling the transmitting and receiving circuits.

3. The invention as defined in claim 1, wherein the switching means of the transmitting circuit includes gain control means at its input to maintain substantially constant audio output and a voltage comparator means at its output for enabling and disabling said transmitting and receiving circuits.

4. The invention as defined in claim 1, and two transistors each controlling activation of one of said transmitting and receiving circuits by selectively coupling power thereto in response to said switching means.

5. The invention as defined in claim 1 wherein said switching means includes a flip-flop for controlling said transmitting and receiving circuits.

6. The invention as defined in claim 2, wherein the response rate of said voltage comparator means prevents activation of the transmitting circuit by a single sharp impulse from the microphone.

7. The invention as defined in claim 1, wherein the transmitting and receiving circuits are contained in a single package, and crystal means in said package controls the frequency range in which the system operates.

8. The invention as defined in claim 1, wherein said transmitting circuit includes a tunnel diode for frequency modulation and frequency multiplication.

9. The invention as defined in claim 1, wherein the transmitting circuit includes a first amplifier responsive to said microphone, a second amplifier and a tunnel diode interposed between said first and second amplifiers.

10. The invention as defined in claim 1, wherein the transmitting circuit includes a first amplifier responsive to said microphone, a local oscillator connected to the output of said first amplifier, a second amplifier loaded with a tank circuit having selected correlation to the frequency of said oscillator, and a tunnel diode connected between said first and second amplifiers for both frequency modulation and frequency multiplication.

11. The invention as defined in claim 9, wherein the transmitting circuit includes a third amplifier connected to the output of the second amplifier and cooperating with said second amplifier to boost power and remove unwanted harmonics in said transmitting circuit.

12. The invention as defined in claim 9, wherein a capacitor is interposed between said tunnel diode and said second amplifier.

13. The invention as defined in claim 1 wherein said transmitting and receiving circuits each include means for selecting the frequency for transmission and reception, said frequency selected for primarily far field operation.

14. The invention as defined in claim 1 wherein said transmitting antenna means and said receiving antenna means are separate antennas.

* * * * *

Disclaimer

4,166,978.—*Maynard E. White*, Elkhart, Ind.; *Kenneth E. Monroe* and *Lindsey E. Waldorf*, Ann Arbor, Mich. TWO-WAY VOICE CONTROLLED COMMUNICATION SYSTEM. Patent dated Sept. 4, 1979. Disclaimer filed Jan. 26, 1981, by the assignee, *Maynard E. White*.

The term subsequent to May 1, 1996 has been disclaimed.

[*Official Gazette March 31, 1981.*]